(No Model.)    5 Sheets—Sheet 1.

G. L. VAN BUREN & T. C. DAVIS.
CORN HARVESTER.

No. 512,072.    Patented Jan. 2, 1894.

WITNESSES
Jesse Heller.
Phil C Masi.

INVENTORS
G. L. Van Buren.
Thomas C. Davis,
by E. W. Anderson
their Attorney (No Model.) 5 Sheets—Sheet 3.

G. L. VAN BUREN & T. C. DAVIS.
CORN HARVESTER.

No. 512,072. Patented Jan. 2, 1894.

WITNESSES
Jesse Heller.
Phille Masi

INVENTORS
G. L. Van Buren,
Thomas C. Davis,
by E. W. Anderson
their Attorney

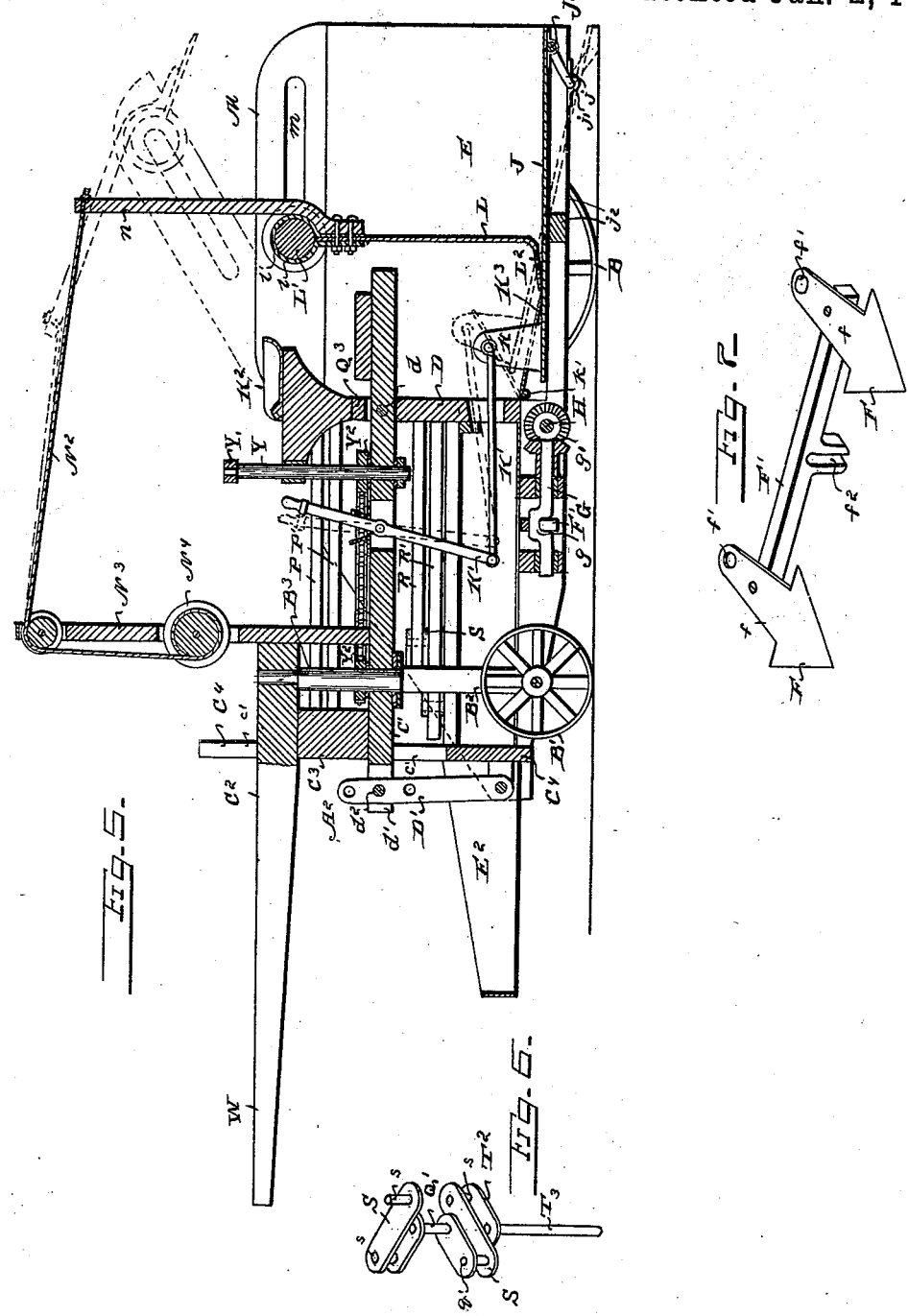

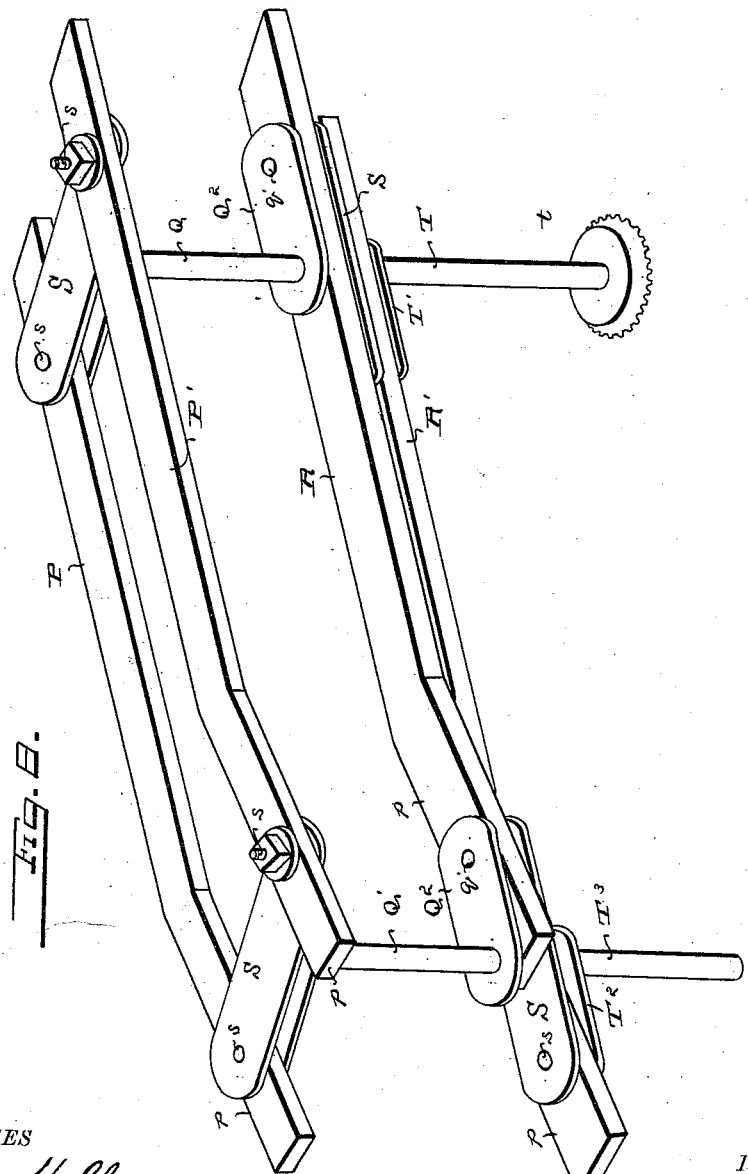

United States Patent Office.

GEORGE L. VAN BUREN AND THOMAS CLARK DAVIS, OF BENEDICT, KANSAS.

CORN-HARVESTER.

SPECIFICATION forming part of Letters Patent No. 512,072, dated January 2, 1894.

Application filed March 31, 1893. Serial No. 468,502. (No model.)

*To all whom it may concern:*

Be it known that we, GEORGE L. VAN BUREN and THOMAS CLARK DAVIS, citizens of the United States, and residents of Benedict, in the county of Wilson and State of Kansas, have invented certain new and useful Improvements in Corn-Harvesters; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
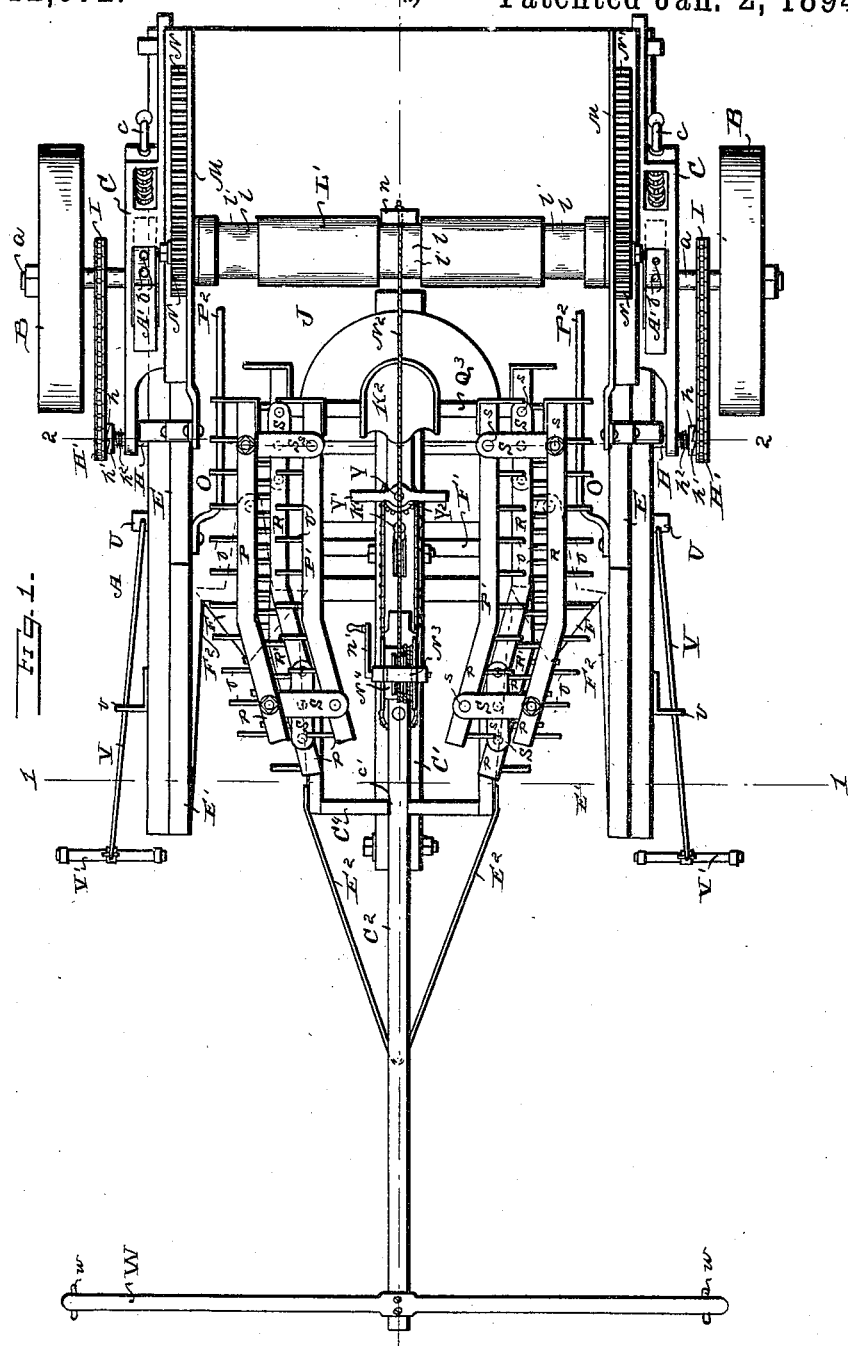
Figure 2:
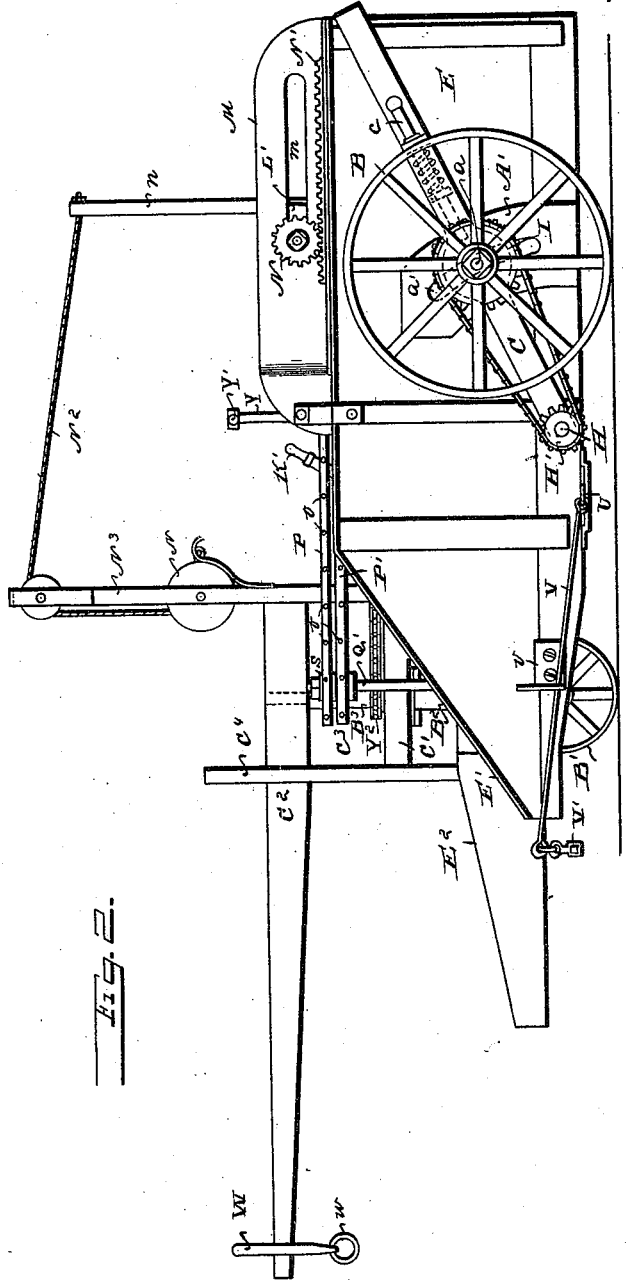
Figure 3:
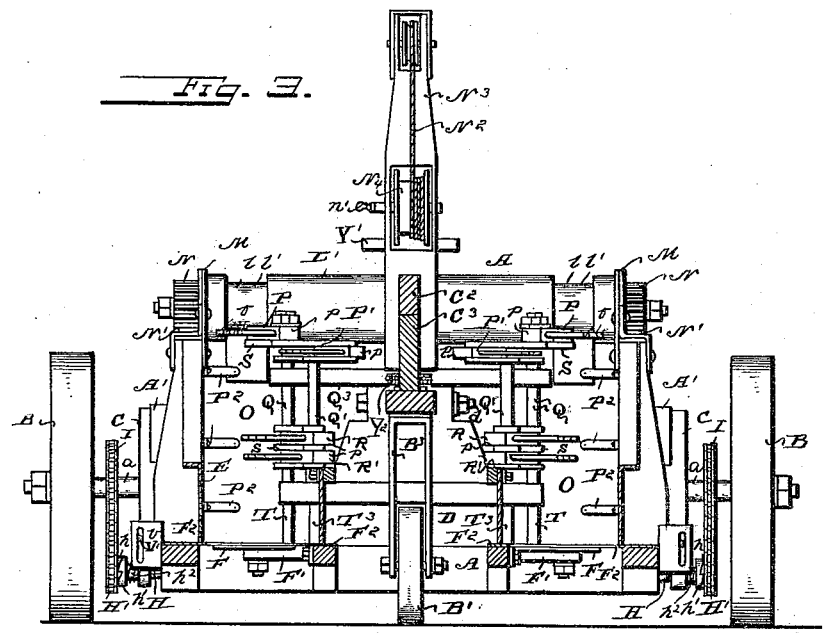
Figure 4:
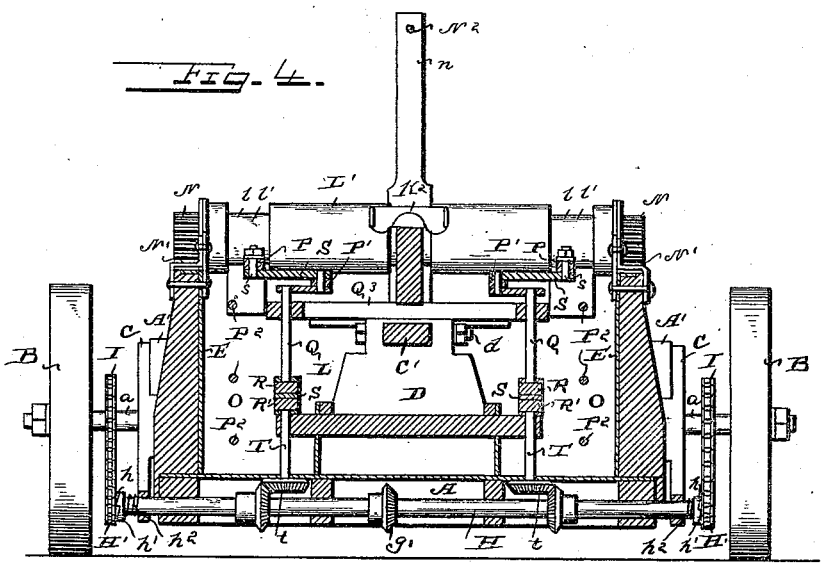

Figure 1 is a top plan view of the harvester. Fig. 2 is a side elevation of the same. Figs. 3 and 4 are transverse vertical sections on the lines 1—1, and 2—2, respectively, of Fig. 1. Fig. 5 is a longitudinal vertical section of the harvester on the line 3—3, Fig. 1. Fig. 6 is a detail view of part of the feeder operating mechanism. Fig. 7 is a detail view of the cutting mechanism, and Fig. 8 is an enlarged perspective view of the feeding mechanism.

This invention has relation to certain new and useful improvements in corn harvesters, the object being to provide a machine of this character of generally improved construction, which will cut and shock corn in an effective and practical manner; and the invention consists in the novel construction and combination of parts, all as hereinafter specified.

Referring to the accompanying drawings, the letter A designates the main frame of the machine, supported upon two main wheels B, B, and a guide wheel B′, the latter being near the front end of the machine. The wheels B, B, are journaled upon short axles $a$, $a$, carried by brackets C, C, which are adjustable upon curved arms A′ of the frame. Said brackets are slotted to fit over said arms, and the axle shafts are extended through arcuate slots $a'$ in said arms. Upon the curved edge of each of said arms is a series of seats or depressions $b$, any one of which is designed to be engaged by a spring bolt $c$, carried by the bracket C. By this arrangement, the wheels B, B, are capable of adjustment to support the frame at different heights.

The guide wheel B′ is carried by a bracket B², the post B³ of which is journaled in a beam or bar C′ of the frame, and in the rear end portion of a tongue C². The forward portion of the beam or bar C′, and the rear portion of the tongue are connected by a short bar C³, and are supported in a slot $c'$ of an upright portion C⁴ of the frame, at the forward portion of the machine. The rear end portion of the beam or bar C′ is supported on a bolt or pivot $d$ carried by an upright portion D of the frame. It will therefore be apparent that the said beam or bar with the guide wheel and tongue may be adjusted vertically to agree with the adjustment of the main wheels B, B; and in order to hold said parts to the proper adjustment, an arm D′ is pivoted to the lower portion of the upright C⁴, said arm being received in a slot $d'$ in the forward end of the beam or bar C′, and adjustably secured therein by a bolt $d^2$ adapted to engage any one of a series of apertures in said arm.

The machine is designed to be a two-row cutter, and is provided with high side boards E, which at their forward ends are extended to form the side guards or guides E′, which act in connection with a center guard or pilot E² to carry the corn in between the side boards and the forward central portion A² of the frame to the knives or cutters F. Said center guard or pilot is of V-shape, and is secured to the portion A² of the frame. The knives or cutters F, F, have long shanks $f$, which are pivoted at their rear portions at $f'$ to the frame, and at their intermediate portions to a bar F′, having a slot at $f^2$, which is engaged by a crank $g$ of a short shaft G, driven by a bevel gear connection $g'$ with a main driving shaft H. The revolution of said shaft G imparts a reciprocating endwise movement to the bar F′, and an oscillatory movement to the knives F, which acting in connection with stationary knives or cutters F², produce a shear cut. Other well known forms of cutting mechanism may however be employed.

The main driving shaft H is journaled transversely of the machine, and is driven at each end by sprocket gear H′, H′, from sprocket wheels I inside of the main wheels. Said sprocket wheels I should be about three times the diameter of the wheels H′ on the shaft H, and the bevel gear $g'$ should be of such proportions as to still further increase the speed of revolution of the shaft G. Said wheels H' are made capable of an endwise movement upon the shaft, and are provided with clutch sections $h$, which engage corresponding clutches $h'$, fast with the shaft. Springs $h^2$ normally hold said clutches in engagement, and they are designed to be thrown out of engagement by means of any suitable lever mechanism, not shown.

J designates the shocking platform which is located to the rear of the cutter, said platform at its rear portion being secured upon a transverse rod or rock shaft J', the cranked ends $j$ of which are extended downwardly and forwardly and are provided with loose bearings at $j'$ on the under side of the frame. The forward and central portions of the platform rest loosely upon bars $j^2$ of the frame. Near the forward edge of the platform is a lug or bracket $k$, in which is pivotally secured one end of a link rod K, the other end of which is connected to the lower arm of a lever K', which is fulcrumed in a slot in the rear portion of the bar or beam C' in position to be operated from the seat K². By throwing the upper arm of this lever forwardly the platform is thrown rearwardly and downwardly into inclined position. This is effected by the link rod K acting upon the rear portion of the platform, and causing the rod or shaft J' to rock rearward and downward. In order to close the gap formed at the rear edge of the platform by this movement, a transverse gate K³ is provided, said gate being carried by a rod $k'$ having loose bearings in the frame. When the parts are in their normal position, this gate lies flat upon the forward portion of the platform, but upon the upward movement of this portion of the platform, the gate is raised with it, and closes the gap which would otherwise be formed. Said gate when so raised also serves as a stop to check the corn from passing from the cutters onto the platform until the shock has been discharged, as will hereinafter be described.

L designates what we term the "shocker," which consists in a broad transverse vertical plate, preferably of sheet metal, which normally closes the rear end of the machine, and a movable roller L', to which said plate is attached. The lower portion of the plate is bent forwardly into nearly horizontal position, as shown at L², said horizontal portion normally overlying the platform. The upper edge of the plate has a number of arms bent to form circular loops $l$, which loosely engage circular reduced portions $l'$ of the roller L', and enable the plate to have a swinging connection with said roller. This roller extends transversely across the machine, above the upper edges of the side boards, and at both ends its shaft projects through elongated slots $m$ in arms M. Said arms at their end portions are pivoted to the respective side boards E, and are normally supported upon the upper edges of said boards in horizontal parallel position. The roller at each end also carries a pinion N, which runs in a rack N' on the arm M. The length of the slots $m$ and of the rack N' is such that the roller may travel nearly the entire length of the platform.

Affixed to the central portion of the plate L is an upright $n$, to which is attached one end of a flexible connection N², which runs forwardly, passing over a pulley carried by an upright N³ of the frame, and down and around a spool or drum N⁴, also carried by said upright, and provided with a crank $n'$. By winding this connection N² upon the spool or drum, the roller, plate, and arms M are raised into the position shown in Fig. 5 to permit the discharge of the shock, as will be hereinafter more fully described, as will also the manner in which the shocker operates during the formation of the shock.

Leading from the cutters to the platform at each side of the machine is a guide-way O, through which the corn passes to the platform, and in order to bring the corn to the knives and to force it through to the platform, feeding mechanism is provided of the following construction: As the feeding mechanism at both sides of the machine is of the same construction, it will be necessary to refer to but one, corresponding letters of reference on the drawings being applied to corresponding parts of both mechanisms. The mechanism consists of four bars carrying each a series of teeth or fingers $o$, said bars being arranged in two pairs one above the other, longitudinally of the guideway O. The bars constituting the upper pair are designated respectively by the letters P, P', while those of the lower pair are designated by the letters R, R'. The two bars of each pair are connected with each other by means of short parallel links or arms S, having oppositely projecting pins or studs $s$ which loosely engage bearings in the bars, said links or arms being so arranged that while those connecting each pair are parallel, those connecting one pair are at about right angles to those connecting the other pair. Connecting the bars P, P' and R R' of the respective pairs are two vertical shafts Q, Q', having at their ends oppositely turned crank arms Q², having studs or pins $q'$, which engage bearings in the respective bars. The shaft Q has bearings in a cross bar Q³ which supports the seat. Motion is imparted to the bars by means of a vertical shaft T, driven by a bevel gear connection $t$ with the main driving shaft H. Said shaft T at its upper end has a crank arm T' carrying a pin or stud which has loose bearings in the rear end portion of the lower bar R', the other end of said bar being carried by a crank arm T² of a vertical shaft T³.

From the above description it will be apparent that as the shaft T is revolved, each pair of the feeder bars will be given a parallel reciprocating rotary movement, each bar advancing over the guideway during its rearward movement, and falling back during its forward movement; and that the movements are so timed that at the time either bar of one pair commences to fall back, the corresponding bar of the other pair commences to advance, and vice versa. By this arrangement the corn is continuously brought to the action of the cutters, and is fed backwardly to the platform, the teeth or fingers $o$ catching and carrying the stalks rearward, but falling back clear thereof during the forward movement. In order to act more effectively in bringing the corn in to the cutters, the forward ends $p$ of all the bars are bent inwardly as shown, giving them a more sweeping or wider movement. Acting in connection with the feeders to hold the corn upright as it is carried back, is a series of horizontal spring rods $p^2$ which are secured at their forward ends to the side boards E.

At the commencement of the formation of a shock, the roller L' is at the limit of its forward movement, and the corn is delivered by the feeders onto the horizontal or foot portion L² of the shocker and against the roller. As the corn continues to be packed against the roller, it recedes under the pressure, the pinions N running in the racks N', the front half of the shock being carried on the foot L². This operation continues until the roller reaches the limit of its rearward movement and the corn is sufficiently packed, when the shock is bound by hand. The operator then winds the flexible connection upon the drum or spool by means of the crank $n'$, which raises the roller and shocker into the position shown in Fig. 5 (in dotted lines) with the said shocker in substantially horizontal position, so that ordinarily it can clear the shock before the latter is discharged. He then throws the lever K' forwardly, dropping the rear portion of the platform to the ground. The roller runs back by gravity to the front end of the slots in front of the shock, carrying with it the shocker plate and as the machine advances, the platform is drawn from under the shock, and the latter is deposited upon the ground. By letting out on the flexible connection N², the arms M, M return to their normal positions, and the plate L swings down into vertical position, and the formation of a new shock is commenced.

U is a draft bar which extends transversely underneath the frame, and shortly in front of the wheels B, B, said bar being pivoted to the frame at its central portion. Connected to each end of said bar is a draft rod V, which extends forwardly through a guide $v$ and carries a singletree V'. A horse is attached to each of these singletrees, one horse walking each side of the two rows which the machine cuts. The horses are attached to rings $w$ on the guiding arms W, carried by the pole, so that as the machine is steered it will lead the horses in the desired direction.

The machine is steered by means of a rotary shaft or post Y in front of the seat and having a cross bar Y' at its upper end. Said shaft or post carries a sprocket wheel Y² from which a chain runs to a similar wheel on the post B³ of the guide wheel B'.

The platform and side boards may be made from sheet steel if desired.

It is obvious that certain minor parts of the construction as shown and described may be varied without departing from the spirit and scope of the invention.

Having described this invention, what we claim as our invention, and desire to secure by Letters Patent, is—

1. In a corn harvester, the combination with the frame and the cutting and feeding mechanisms, of the shocking platform, the transverse roller arranged to reciprocate above and over said platform, and the shocking plate carried by said roller, and means for operating said roller and plate, substantially as specified.

2. In a corn harvester, the combination with the frame and the cutting and feeding mechanisms, of the movable platform, the side boards therefor, the transverse roller arranged to reciprocate above and over said platform, the depending plate carried by said roller and having a loose connection therewith, and means for operating said roller and shocker, substantially as specified.

3. In a corn harvester, the combination with the cutting and feeding mechanisms, the platform pivoted at its rear end, and capable of a vertical movement, the pivoted gate, the transverse roller adapted to reciprocate above and over said platform, the shocker plate carried by said roller and having a swinging connection therewith, and means for operating said platform and the roller and plate, substantially as specified.

4. In a corn harvester, the shocking mechanism, comprising the arms pivoted at their forward ends one to each of the lateral portions of the frame above the shocking platform or table, the slots in said arms, the racks, the transverse roller working in said slots and having gear running in said racks, and the shocking plate swung from said roller, substantially as specified.

5. In a corn harvester, the combination with the cutting and feeding mechanisms, of the vertically movable platform, the side boards, the arms pivoted one to each of said boards, the transverse roller carried by said arms and capable of a forward and backward movement, the shocker plate carried by said roller, and means for operating said platform, roller and plate to effect the discharge of the shock, substantially as specified.

6. In a corn harvester, the combination with the shocking platform, the frame having the side boards, and the feeding mechanisms, of the arms pivoted to said side boards, and supported thereby, the slots in said arms, the racks, the roller working in said slots and carrying pinions running in said racks, the shocker plate carried by said roller, and having a swinging connection therewith, and means for raising said roller, shocker plate and arms, substantially as specified.

7. In a corn harvester, the combination of the vertically movable platform, of the side boards, the arms M pivoted to said side boards, and having elongated slots therein, the racks N', the roller L' engaging said slots, and carrying pinions running in said racks, the shocker plate L swung from said roller, a cranked spool or drum and a flexible connection between said plate and spool or drum, substantially as specified.

8. In a corn harvester, the combination of the frame, the cutting mechanism, the shocker platform, the guides leading from the cutting mechanism to said platform, the reciprocating, rotary, toothed bars working in said guides, the transverse roller arranged to reciprocate over and above said platform, the broad plate swung from said roller, and the operating mechanism for said roller and plate, substantially as specified.

9. In a corn harvester, the combination with the frame and its vertically adjustable drive wheels, of the beam C' carried upon a pivot bolt, the tongue connected to said beam, the upright $c^4$ having a slot in which said beam and tongue are supported, the means for securing the adjustment of said beam and tongue, the guide wheel, its bracket, the bracket post having bearings in said beam and tongue, and steering gear in connection with said post, substantially as specified.

10. In a corn harvester, the combination with the frame having high side boards, the shocking platform, the cranked rock shaft to which said platform is secured, the shocker having the plate L provided with a horizontal foot portion, and the roller L' arranged to reciprocate lengthwise over said platform, substantially as specified.

In testimony whereof we affix our signatures in presence of two witnesses.

GEORGE L. VAN BUREN.
THOMAS CLARK DAVIS.

Witnesses:
FRANK KEEFER,
WILLIAM C. REYNOLDS.